Patented Dec. 28, 1948

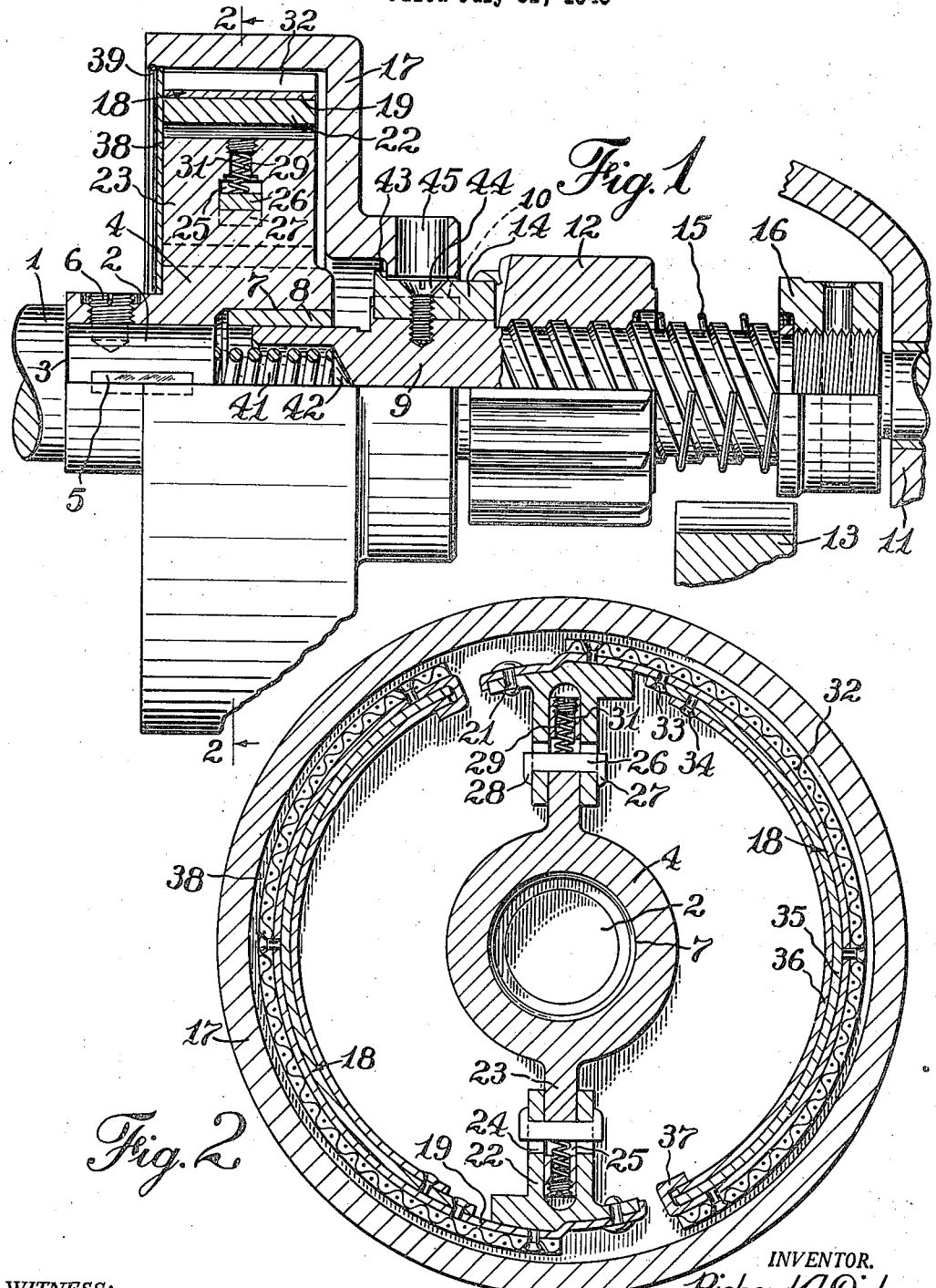

2,457,213

UNITED STATES PATENT OFFICE 2,457,213

ENGINE STARTER GEARING

Richard G. Dickens, Elmira Heights, N. Y., assignor to Bendix Aviation Corporation, a corporation of Delaware Application July 31, 1946, Serial No. 687,246

3 Claims. (Cl. 74—7)

The present invention relates to engine starter gearing and more particularly to a form of drive which is especially adapted for use where a small internal combustion engine is used to start a large engine.

In engine starters of the type which automatically engage the drive when the source of power is energized, there is a peak torque developed when the drive is first established which imposes excessive stresses on the parts if some form of yielding driving connection is not utilized. In the smaller types of drive this yielding driving connection is usually in the form of an elastic element such as a spring, while in the larger or heavy duty types it is customary to utilize a preset friction clutch to limit by slippage the maximum torque transmitted.

Transmissions of this kind are well adapted for their purpose when an electric starting motor is used as a source of power, since the torque developed by such a motor increases with reduction of the rotative speed, and reaches a maximum when the motor is stalled. They are not so appropriate for connecting a small internal combustion engine to start a large engine however, since the torque of the small engine diminishes with reduction of speed below a fairly high value, and becomes zero when the engine stalls. For starting installations of the latter type therefore, it is desirable to have a drive which will transmit substantially no torque when the starting engine is idling so as to avoid stalling the starting engine, but which will build up to a maximum torque at or about the speed at which the starting engine is adapted to deliver its maximum torque.

It is an object of the present invention to provide a novel engine starter drive of the automatically engaging and disengaging type which incorporates a yielding connection of variable torque capacity.

It is another object to provide such a device in which the torque capacity of the drive varies substantially in accordance with the speed of the prime mover becoming negligible when the prime mover is idling.

It is another object to provide such a device which incorporates means for automatically disengaging the drive when the main engine starts.

Further objects and advantages will be apparent from the following description taken in connection with the accompanying drawing in which:

Fig. 1 is a side elevation partly broken away and in section of a starter drive embodying a preferred form of the invention; and Fig. 2 is a section taken substantially on the line 2—2 of Fig. 1.

In Fig. 1 of the drawing there is illustrated a power shaft 1 which may be the extended crank shaft of a starting engine not illustrated, or which may be driven from such starting engine through suitable reduction gearing. The end of the power shaft 1 is reduced in diameter as shown at 2, providing a shoulder 3 against which is seated a driving clutch member 4 which is rigidly connected to the power shaft by suitable means such as a key 5 and set screw 6.

The driving clutch member 4 is provided with an enlarged counterbore 7 receiving a bushing 8 serving as a bearing for one end of a screw shaft 9, the opposite end of which is journalled in a suitable fixed bearing 11. A pinion 12 is threaded on the screw shaft 9 for longitudinal movement into and out of mesh with a gear 13 which is connected in any suitable manner to the crank shaft of the main engine to be started. The pinion 12 is normally maintained in its idle position against a back stop 14 by means of an anti-drift spring 15, and the operative position of the pinion is defined by a stop nut 16 suitably fixed as indicated on the end of the screw shaft 9.

Centrifugal clutch means for connecting the driving clutch member 4 to the screw shaft 9 is provided comprising a driven clutch drum 17 splined on the end of the screw shaft 9 as indicated at 10 in position to surround the driving clutch member 4, and a plurality of flexible clutch shoes 18 connected to rotate with the driving clutch member 4 with freedom for radial movement into frictional engagement with the interior of the drum 17.

As best shown in Fig. 2 each clutch shoe comprises a flexible band 19 rigidly attached at one end as indicated at 21 to a bifurcated block 22 which is mounted for radial sliding movement on a vane 23 extending radially from the driving clutch member 4. The block 22 and vane 23 are provided with registering slots 24 and 25 respectively adapted to receive a rectangular key 26 traversing the slots and provided with terminal shoulders 27, 28 engaging the exterior of the block 22. A spring 29 seated in a recess 31 in the vane 23 bears on the key 26 and thereby normally presses the block 22 inwardly so as to hold the clutch shoe 18 out of engagement with the drum 17.

The band 19 of the clutch shoe 18 is provided exteriorly with a suitable friction lining 32, and has attached to its inner side as indicated at 33 and 34 one or more additional flexible bands 35 and 36 serving to increase the inertia of the clutch shoe. The auxiliary bands are rigidly attached to the main band 19 at one end only as illustrated in order to preserve the flexibility of the band. The main band 19 may be bent back on itself at its free end as indicated at 37, to surround and act as a retainer for the free ends of the auxiliary bands. A disc 38 is mounted in the open end of the clutch drum 17 in position to bear against the side of the driving clutch member 4 and is retained therein by a lock ring 39 so as to enclose the clutch and limit relative longitudinal movement of the clutch members.

A mesh enforcing spring 41 seated in a counterbore 42 in the end of the screw shaft and bearing against the end of the power shaft 2 urges the screw shaft to the right in Fig. 1, such movement being limited by the engagement of a shoulder 43 on the backstop key 14 with the interior of the clutch drum 17. In order to facilitate assembly and disassembly of the parts, the backstop member 14 is attached to the screw shaft 9 by means of a screw 44 access to which is permitted by a radial opening 45 through the hub of the clutch drum 17.

In operation, starting with the parts in the positions illustrated, rotation of the power shaft 2 at idling speed by the starting engine causes rotation of the driving clutch member 4 and clutch shoes 18, but such rotation is not transmitted to the driven clutch drum 17 since the clutch shoes are held out of engagement therewith by the springs 29. When it is desired to crank the main engine, the starting engine is accelerated to its efficient operating speed, whereby the clutch shoes 18 are moved out by centrifugal force into contact with the interior of the clutch drum 17, such movement being permitted by the sliding connection of the blocks 22 on the vanes 23 of the driving clutch member 4, and by the flexibility of the elements of the clutch shoes. The consequent rotation of the driven clutch drum 17 is transmitted to the screw shaft 9 thereby causing traversal of the pinion 12 into mesh with the engine gear 13 until it engages the stop nut 16 whereupon the rotation of the pinion 12 is transmitted to the engine gear.

The consequent application of load to the starting engine tends initially to slow it down, but this reduction in speed causes the pressure of the clutch shoes 18 against the drum 17 to be relieved progressively so as to prevent stalling the starting engine and to enable it to operate at its maximum efficiency. The main engine is thereby gradually brought up to cranking speed without the application of excessive stresses to the parts of the drive, and in such a manner as to most efficiently utilize the characteristics of the starting engine.

When the main engine starts, the acceleration of the engine gear 13 returns the pinion 12 to idle position thus disconnecting the starter drive, whereupon the starting engine may be allowed to idle, or may be de-energized if a repetition of the starting cycle is unnecessary.

Although but one embodiment of the invention has been shown and described in detail, it will be understood that other embodiments are possible and various changes may be made in the arrangement of the parts without departing from the spirit of the invention as defined in the claims appended hereto.

What is claimed is:

1. In a transmission for connecting a small internal combustion engine to start a large internal combustion engine, a power shaft rotated by the starting engine, a driving clutch member fixed thereon, a screw shaft slidably journalled in the driving clutch member, a pinion threaded on the screw shaft for movement into and out of mesh with a gear of the engine to be started, a driven clutch drum surrounding the driving clutch member and non-rotatably connected to the screw shaft, a centrifugal clutch means mounted on the driving clutch member to rotate therewith with freedom for radial movement into engagement with the driven clutch drum and yielding means for normally holding the centrifugal clutch member out of engagement with the clutch drum.

2. A transmission as set forth in claim 1 in which said centrifugal clutch member comprises a flexible band attached at one end to the driving clutch member.

3. A transmission as set forth in claim 1 in which said centrifugal clutch means comprises a flexible band attached at one end to the driving clutch member, said band having a friction lining adapted to engage the interior of the clutch drum, and a flexible weight member attached to the band.

RICHARD G. DICKENS.

REFERENCES CITED

The following references are of record in the file of this patent:

UNITED STATES PATENTS

| Number | Name | Date |
| --- | --- | --- |
| 1,354,157 | Bendix | Sept. 28, 1920 |
| 1,983,661 | Frantz | Dec. 11, 1934 |
| 1,994,141 | Madden | Mar. 12, 1935 |
| 2,203,795 | Nardone | June 11, 1940 |
| 2,255,015 | Sekella | Sept. 2, 1941 |